United States Patent [19]

Baima et al.

[11] 4,275,523
[45] Jun. 30, 1981

[54] DEVICE FOR KEEPING UNDER CONTROL A POPULATION OF SELECTED SPECIES OF INSECTS

[75] Inventors: Mario Baima, Turin; Gian P. Tavoni, Cambiano, both of Italy

[73] Assignee: Centro Ricerche Fiat S.p.A., Orbassano Turin, Italy

[21] Appl. No.: 20,582

[22] Filed: Mar. 14, 1979

[30] Foreign Application Priority Data

Mar. 24, 1978 [IT] Italy ............................. 67666 A/78

[51] Int. Cl.³ ............................................. A01M 1/22
[52] U.S. Cl. ..................................................... 43/112
[58] Field of Search .............. 43/112, 98; 253/92 MS; 331/74

[56] References Cited

U.S. PATENT DOCUMENTS

| 2,748,285 | 5/1956 | Beaufoy | 331/74 |
| 2,881,554 | 4/1959 | Laine | 43/112 X |
| 3,040,980 | 6/1962 | Mann | 43/100 X |
| 3,796,864 | 3/1974 | Sampey | 235/92 TC |
| 3,935,662 | 2/1976 | Hamid | 43/112 |
| 3,971,292 | 7/1976 | Paniagua | 43/112 |
| 4,179,839 | 12/1979 | Salotti | 43/112 |

FOREIGN PATENT DOCUMENTS 2815686 10/1978 Fed. Rep. of Germany ............. 43/112

Primary Examiner—Nicholas P. Godici

Attorney, Agent, or Firm—Sughrue, Rothwell, Mion, Zinn and Macpeak

[57] ABSTRACT

An apparatus for use in monitoring the numbers of a selected species of insect comprising one or more traps into which is put a synthesized pheromone to attract that particular insect. Each trap has a grille comprising a plurality of bars between which is applied a high voltage by means of a high voltage generator, so that when an insect of the selected species tries to enter the trap it touches adjacent bars and is electrocuted by the electric discharge between them. This discharge is detected by a discharge detector connected to the trap and the detector passes a signal to a transmitter which transmits it to a central receiver equipped with a discriminator for ignoring signals other than those from the transmitter and for passing the signals representing discharges to a pulse counter whereby a total of the number of insects trapped in a given time can be obtained at a central station without visiting each trap. An astable circuit, which is interposed between the high voltage generator and a portable voltage source such as an accumulator, operates to feed the high voltage generator from a battery at spaced intervals so as to lengthen the duration of the charge of the battery and therefore the duration of efficient operation of the device. The high voltage generator is capable of providing the high voltage even during those periods in which the astable circuit cuts off the supply from the battery. The signal transmitted to the central receiver can be a coded signal.

7 Claims, 3 Drawing Figures

DEVICE FOR KEEPING UNDER CONTROL A POPULATION OF SELECTED SPECIES OF INSECTS

BACKGROUND OF THE INVENTION

1. Field of the Invention

The present invention relates to a device for use in connection with control of insects, in particular for monitoring the population of selected species of insects.

2. Prior Art

In order to be able to protect crops adequately, it is necessary to be able to determine exactly when any given species of insect begins to pose a threat to them so that measures can be taken to reduce the infestation of that insect, for example, by spraying an appropriate insecticide.

U.S. application Ser. No. 895,554 (Salotti et al), filed on Apr. 12, 1978 now U.S. Pat. No. 4,179,839, is directed to a device for use in keeping insect infestations under control, including at least one trap provided with electrical conductor means connected across a high voltage generator and operable to produce an electrical discharge when an insect above a given size comes into contact therewith; a discharge detector operable to detect such electrical discharge and to enable, in response thereto, operation of a radio transmitter whereby to transmit a signal to a radio receiver the output of which is fed to an impulse counter which counts each time the transmitter is operated, to provide an indication, at a location remote from the trap, of the number of insects trapped thereby. In such device the receiver and the impulse counter can be fed from the main supply, but the detector and the transmitter, since they are to be set in a field or other open position, must necessarily be fed from a portable voltage source such as a battery, and therefore the efficiency of the entire device depends on the duration of charge of the battery.

SUMMARY OF THE INVENTION

It is an object of the present invention to provide an improved device for keeping under control the population of selected species of insects which overcomes the abovementioned disadvantage.

Another object of the present invention is to provide a device of the above described type which permits a more precise and reliable indication of the number of trapped insects.

According to the present invention, a device for use in keeping insect infestation under control is provided, said device comprising at least one trap, electrical conductor means on said at least one trap, a high voltage generator, said electrical conductor means being connected across the output of said high voltage generator and being so formed as to produce an electrical discharge when an insect above a given size comes into contact with said electrical conductor means, radio transmitter means, discharge detector means operable to detect electrical discharge across said electrical conductor means and to enable in response thereto, and for a limited time period, operation of said radio transmitter means, radio receiver means for receiving signals transmitted by said radio transmitter means, an impulse counter means connected to the output of said radio receiver means, said impulse counter means operating to count each time said transmitter means is operated, whereby to provide an indication, at a location remote from said trap, of the number of insects, and an astable circuit interposed between said high voltage generator and an electrical voltage source therefor, said astable circuit operating to feed said high voltage generator from said voltage source at spaced intervals.

If the voltage source is, for example, a battery, the utilisation of an astable circuit operating to feed current from the battery only periodically notably lengthens the duration of the charge of the battery and therefore the duration of efficient operation of the device.

According to another feature of the present invention, the high voltage generator is capable of providing a low power high voltage even during those periods in which the astable circuit cuts off the supply from the battery.

The foregoing and further objects, features and advantages of the present invention will be apparent from the following more particular description of two embodiments of the invention as illustrated in the accompanying drawings.

DETAILED DESCRIPTION OF THE INVENTION

Figure 1:
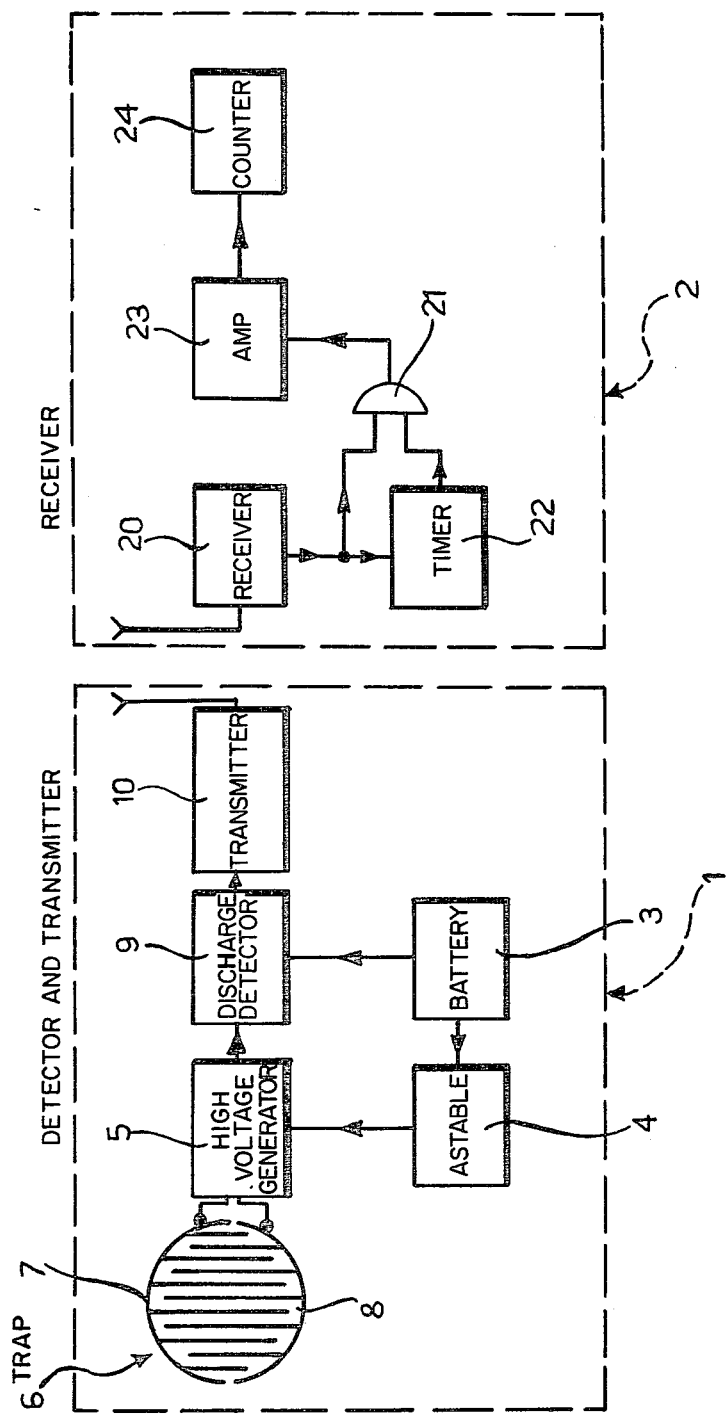
FIG. 1 is a block schematic diagram of a first embodiment of the device according to the present invention.

Referring now to FIG. 1, the embodiment shown comprises two main units, a detector and transmitter unit 1, and a receiver and indicator unit 2. The detector and transmitter unit 1 comprises an electrical battery 3 (which may conveniently be a commonly available 6 or 12 volt type) which feeds a high voltage generator 5 via an astable circuit 4. The astable circuit 4 operates to pass current to the high voltage generator 5 for short periods at intervals of, for example, 20 seconds. The high voltage generator 5 produces, during those intervals when it is fed from the battery, a low power high voltage signal of the order of, for example, 3,000 to 4,000 volts, this voltage being provided even during those periods in which the astable circuit 4 cuts off the supply from the battery 3.

To the two terminals of the high voltage generator 5 are connected respective sets of interlaced parallel bars 7, 8 constituting a grille covering an opening to a trap 6 the interior of which contains a synthesis substance, that is pheromone, which in nature is secreted from the female insect in order to attract the males; the synthesised pheromone could be, for example, one of the types produced by the firm Zoecon under the trade names CODLEMONE, ORFAMONE and FUNEMONE. The two sets of bars 7,8 are disposed in such a way that an insect of the selected species, in order to enter the trap, must necessarily touch two adjacent bars whilst trying to enter, and since the two sets of bars 7,8 are electrically connected to the high voltage generator 5, the potential difference across them is more than sufficient to electrocute the insect.

The high voltage generator 5 is also connected to an electronic discharge detector 9, provided with a monostable circuit the purpose of which will be described in greater detail below, and the discharge detector 9 is connected to the battery 3 and to a radio transmitter 10. In operation of the device, the discharge detector 9 completes a circuit from the battery 3 to the radio transmitter 10 each time an insect contacts the grille 7,8, and causes a discharge, this connection being maintained for a time period determined by the monostable circuit of the discharge detector 9 so that the radio transmitter 10 operates to transmit the signal of a given length each time an insect tries to enter the trap 6.

Figure 2:
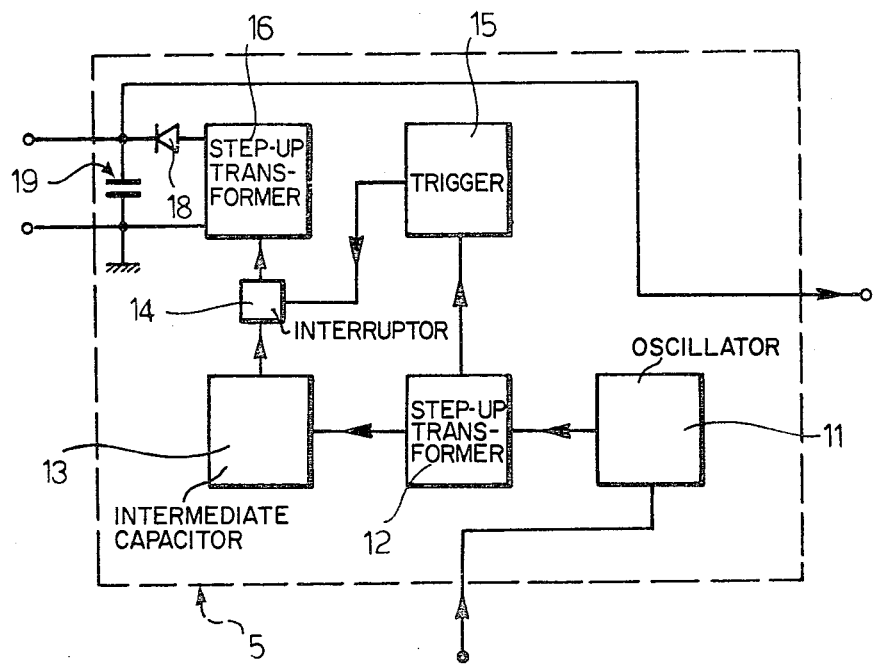
FIG. 2 is a block schematic diagram, illustrating in detail one block of FIG. 1.

Referring now to FIG. 2, the high voltage generator 5 includes an audio frequency oscillator 11 which is fed from the battery 3 via the astable circuit 4. The output from the oscillator 11 is fed to the primary of a first step-up transformer 12 the secondary of which directly charges an intermediate voltage capacitor 13. This capacitor 13 is discharged periodically, by the closure of a circuit interruptor 14 controlled by a trigger circuit 15, through the primary of a second step-up transformer 16. Across the secondary of the second step-up transformer high voltage pulses are induced which are fed, via a diode 18, to charge a high voltage capacitor 19. The high voltage capacitor 19 is connected across the grille 7,8, that is one terminal of the high voltage capacitor 19 is connected to one set of bars 7, and the other terminal is connected to the other set of bars 8. The diode 18 prevents the capacitor 19 from the discharging back through the secondary of the second transformer 16, thus reducing drastically the drop in the voltage across the grille 7, 8 during peiods when the astable circuit 4 cuts off the battery from the high voltage generator 5.

The junction between the cathode of a diode 18 and the high voltage capacitor 19 is connected to the input of a discharge detector 9. When an insect of the selected species, attracted by the pheromone, tries to enter the trap, and is electrocuted by the voltage across the grille 7,8, the capacitor 19 discharges and the detector 9, sensing this discharge, triggers its monostable circuit which, for a predetermined duration of time allows the battery 3 to feed the radio transmitter 10 which therefor transmits a signal for this duration of time. The radio transmitter may be, for example, an amplitude modulation type, such as the transmitter made and sold by the firm G.B.C. Amtromcraft under the reference U.K.302.

Referring back to FIG. 1, a radio receiver 20, for example a U.K.345 made by G.B.C. Amtromcraft, receives the signal transmitted by the transmitter 10, and the output signal from the receiver 20 is fed both to a logic AND gate 21 and a timer circuit 22. The output signal generated by the radio receiver 20 can pass the AND gate 21 only if its duration is greater than a predetermined time (for example five seconds) determind by the timer 22. This thus ensures that disturbance signals, such as those due to lightning or other electrical discharges, or to electromagnetic radiation can be distinguished from the signal from the transmitter 10, the duration of which is determined by the monostable circuit in the discharge detector 9.

The signal generated by the receiver 20, after having passed the gate 21, is amplified by a power stage 23, and is then fed to an impulse counter 24 so that, for each discharge of the capacitor 19, the counter 24 increments by one unit.

The receiver and indicator unit 2 can be located at any convenient position, for example in the farmhouse, for observation by the farmer, who can therefore be continuously informed of the number of insects being caught and can decide on the basis of this, in good time when intervention to reduce the infestation of insects is necessary.

Figure 3:
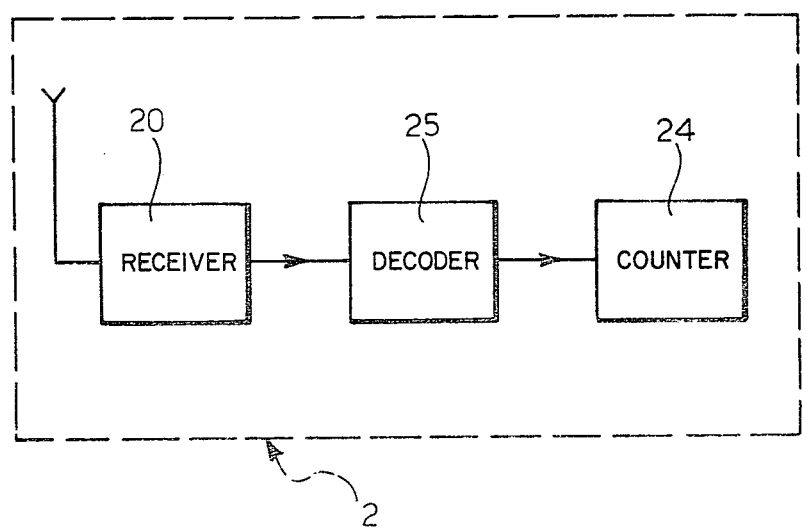
FIG. 3 is a block schematic diagram of a part of a second embodiment of the invention.

As an alternative to the system described above, the signal transmitted by the radio transmitter 10 may be a coded signal, for example it may be a signal composed of two different signal frequencies amplitude modulated on a carrier frequency. A receiver and detector unit 2 of such a modified embodiment is illustrated in FIG. 3 in which the output of the radio receiver 20 is fed to a decoder circuit 25 including two band pass filters, each operating to pass a range of frequencies centered on the frequencies of the two signals generated by the transmitter 10.

The decoder 25 generates an output signal from such an input signal which increments the impulse counter 24. The counter 24 is thus incremented only when the decoder recognises in the output signal from the radio receiver the code used by the radio transmitter 10, that is to say only when the output signal from the radio receiver 20 contains the two frequencies of the signal transmitted by the radio transmitter 10.

While the invention has been particularly shown and described with reference to two embodiments thereof, it will be understood by those skilled in the art that various changes in form and details may be made therein without parting from the spirit and scope of the invention.

What is claimed is:

1. A device for use in keeping insect infestations under control; said device comprising:
    at least one trap,
    electrical conductor means on said at least one trap,
    a high voltage generator,
    said electrical conductor means being connected across the output of said voltage generator and being so formed as to produce an electrical discharge when an insect above a given size comes into contact with said electrical conductor means,
    radio transmitter means,
    discharge detector means operable to detect electrical discharges across said electrical conductor means and to enable, in response thereto, and for a limited time period, operation of said radio transmitter means,
    radio receiver means for receiving signals transmitted by said radio transmitter means,
    an impulse counter means connected to the output of said radio receiver means, said impulse counter means operating to count each time said transmitter means is operated, whereby to provide an indication, at a location remote from said trap of the number of insects trapped thereby, and
    an astable circuit interposed between said high voltage generator and an electrical voltage source therefor, said astable circuit operating to feed said high voltage generator from said voltage source at spaced intervals,
    wherein said high voltage generator includes:
    an oscillator,
    a first step-up transformer having a primary winding and a secondary winding, the output of said oscillator being connected to said primary winding of said step-up transformer,
    a first capacitor,
    the secondary winding of said first step-up transformer being connected to said first capacitor,
    a trigger unit and a circuit interruptor,
    a second step-up transformer having a primary winding and a secondary winding, said trigger circuit controlling the connection of said first capacitor to said primary winding of said second step-up transformer through said circuit interruptor, a second capacitor connected across said secondary winding of said second step-up transformer and said electrical conductor means of said at least one trap, and a diode connected between said secondary winding of said second step-up transformer and one terminal of said second capacitor.

2. A device as set forth in claim 1, wherein the duration of said spaced intervals is of the order of tenths of seconds.

3. A device as set forth in claim 1, wherein said voltage source is an electrical battery.

4. A device as set forth in claim 1, wherein said radio transmitter is operable to transmit a coded signal.

5. A device as set forth in claim 4, wherein there is provided a decoder between said radio receiver and said impulse counter, said decoder operating to generate an output signal to be fed to said impulse counter only when the output signal from said radio receiver is a signal coded with the code transmitted by said radio transmitter.

6. A device as set forth in claim 5, wherein said coded signal comprises two signals of different frequencies.

7. A device as set forth in claim 5, wherein said decoder includes two band pass filters each operable to pass signals over a narrow range of frequencies centered on a respective one of the frequencies of said two signals constituting the coded signal from said transmitter.

* * * * *